United States Patent
Langevin

(10) Patent No.: US 9,452,801 B2
(45) Date of Patent: Sep. 27, 2016

(54) MOTORCYCLE SAFETY SYSTEM WITH INCORPORATED CAMERA AND VIDEO RECORDING

(71) Applicant: Rock Langevin, Edmonton (CA)

(72) Inventor: Rock Langevin, Edmonton (CA)

( * ) Notice: Subject to any disclaimer, the term of this patent is extended or adjusted under 35 U.S.C. 154(b) by 0 days.

(21) Appl. No.: 14/537,883

(22) Filed: Nov. 10, 2014

(65) Prior Publication Data

US 2016/0129962 A1    May 12, 2016

(51) Int. Cl.
| | |
|---|---|
| *H04N 5/77* | (2006.01) |
| *B62J 27/00* | (2006.01) |
| *B62J 6/00* | (2006.01) |
| *B60Q 9/00* | (2006.01) |
| *H04N 5/907* | (2006.01) |
| *B62J 99/00* | (2009.01) |

(52) U.S. Cl.
CPC ........... *B62J 27/00* (2013.01); *B60Q 9/008* (2013.01); *B62J 6/00* (2013.01); *B62J 99/00* (2013.01); *H04N 5/772* (2013.01); *H04N 5/907* (2013.01); *B62J 2099/004* (2013.01); *B62J 2099/0033* (2013.01)

(58) Field of Classification Search
CPC ..... B60K 31/18; B60L 2250/16; B60R 1/00; B60R 2300/302
See application file for complete search history.

(56) References Cited

U.S. PATENT DOCUMENTS

| | | | |
|---|---|---|---|
| 2007/0173983 A1* | 7/2007 | Takahashi | B60R 1/00 701/1 |
| 2008/0232769 A1* | 9/2008 | Jureczki | G11B 27/034 386/213 |
| 2009/0112389 A1* | 4/2009 | Yamamoto | B60C 23/0401 701/31.4 |

\* cited by examiner

*Primary Examiner* — Huy T Nguyen
(74) *Attorney, Agent, or Firm* — David W Barman

(57) ABSTRACT

The present invention is a system for motorcycle safety including a module having a plurality of lights, a camera, an electronic image storage operatively associated with said camera, and an actuator for the system.

6 Claims, 11 Drawing Sheets

MODE "A"

MODE "N"

MODE "B"

MODE "C"

MODE "D"

MOTORCYCLE SAFETY SYSTEM WITH INCORPORATED CAMERA AND VIDEO RECORDING

BACKGROUND OF THE INVENTION

Motorcycle safety devices are continually improving. However, where there is an incident or accident, it is often difficult, if not impossible to collect evidence as to cause.

The present invention addresses this difficulty.

SUMMARY OF THE INVENTION

In one embodiment, the present invention is a warning and/or strobe light system that attached to the front of a motorcycle above the tire and below the headlight, manually activated by the rider to warn approaching vehicles of the presence of the motorcycle.

The device is an early warning system to warn other drivers of the bike's presence. The device is a wrap-around system (160 to 180 degrees, relative to a plane horizontal and coplanar with the front of a motorcycle driver) that flashes very bright strobes when activated. Lights on the very end of either side of the device would always be on to warn drivers on either side of the bike of its presence, while the lights in the centre and to either side of centre would be driver-activated strobe lights. In one embodiment, a 20 second recording (via installed camera) is activated each time the device is turned on to record any potential mishap that may occur. The camera will also record the speed, rpm, and the gear that the bike was in during the recording.

In one embodiment, a Light Emitting Diode (LED) light is used to warn other people of my presence. Built horizontally with arch up to 180° in the upper front of the motorcycle.

An actuator, in one embodiment being a push button switch is mounted under the left handle even with the thumb. The actuator operates the light manually as needed. In one embodiment, the lights cycles in on-off progressions in intervals, for example, 3 second interruption of the headlight to create a 100% strobe or warning effect.

In one embodiment, a camera is also mounted in the middle front of the light assembly with a display of the RPM-KM hr-switch Gear and Flasher on the memory card. A green function light alerts a user as to the on/off function of the camera. Preferably, the system is configured with a storage device, for example, a 2 to 8 hours flash memory card for storing recorded images.

In one embodiment, the present invention is a system for motorcycle safety comprising:

a module including a plurality of lights, a camera, an electronic image storage operatively associated with said camera, and an actuator for the system.

In one embodiment, the camera initiates and operates once motorcycle ignition is engaged.

In one embodiment, the electronic image storage includes an automatic overwrite. That is to say, once storage memory is full, the oldest data is overwritten by newly acquired data.

In one embodiment, the electronic image storage includes a user selectable storage overwrite such that overwrite only occurs upon a user prompt and/or user selectable setting.

In one embodiment, the camera is configured in a fixed position to capture information about at least one of motorcycle speed, motorcycle gear, motorcycle engine revolutions per minute, or combinations thereof from a motorcycle instrument panel.

In one embodiment, the plurality of lights is user selectable to illuminate, cycle between constant illumination and variable illumination and non-illumination.

In one embodiment, the camera ceases operation when motorcycle engine is stopped.

In one embodiment, the camera continues operation when motorcycle engine is stopped and subsequently ceases operation when manually stopped. Alternatively, one embodiment provides for the camera to continue operating for a pre-selected and/or user selected amount of time after the motorcycle ignition is turned off.

DETAILED DESCRIPTION OF THE PREFERRED EMBODIMENT

Figure 1:
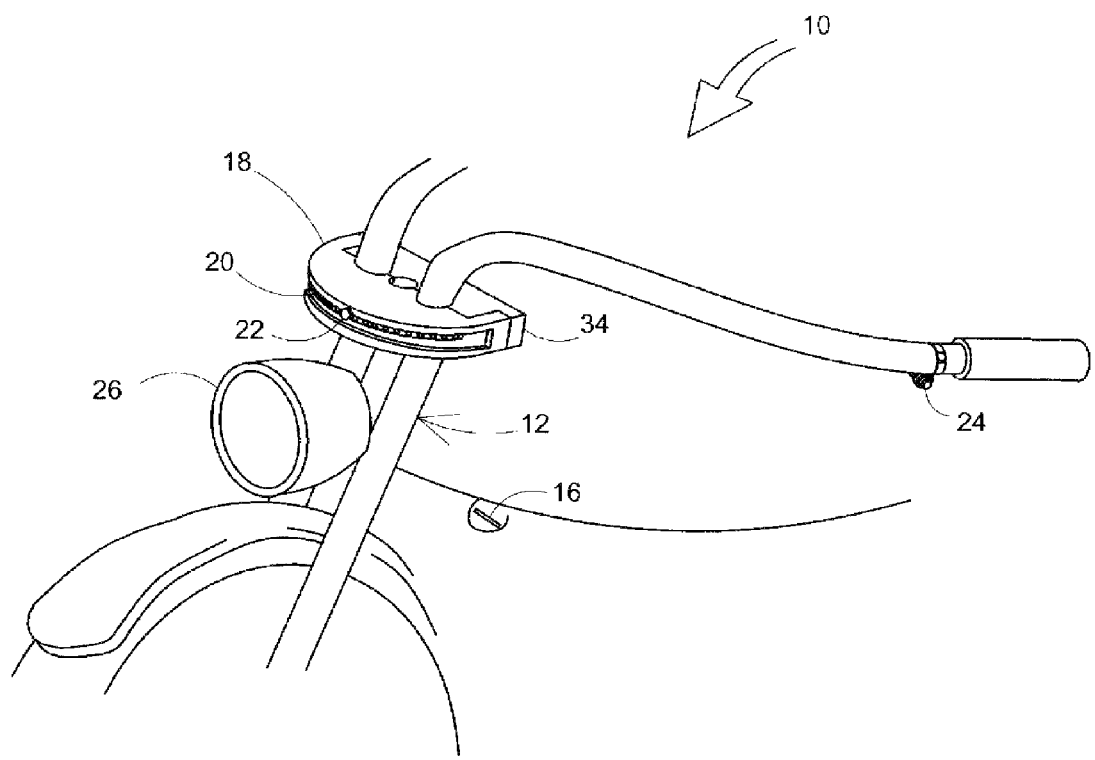
FIG. 1 is a partial perspective view of the system according to one embodiment of the present invention.
Figure 2:
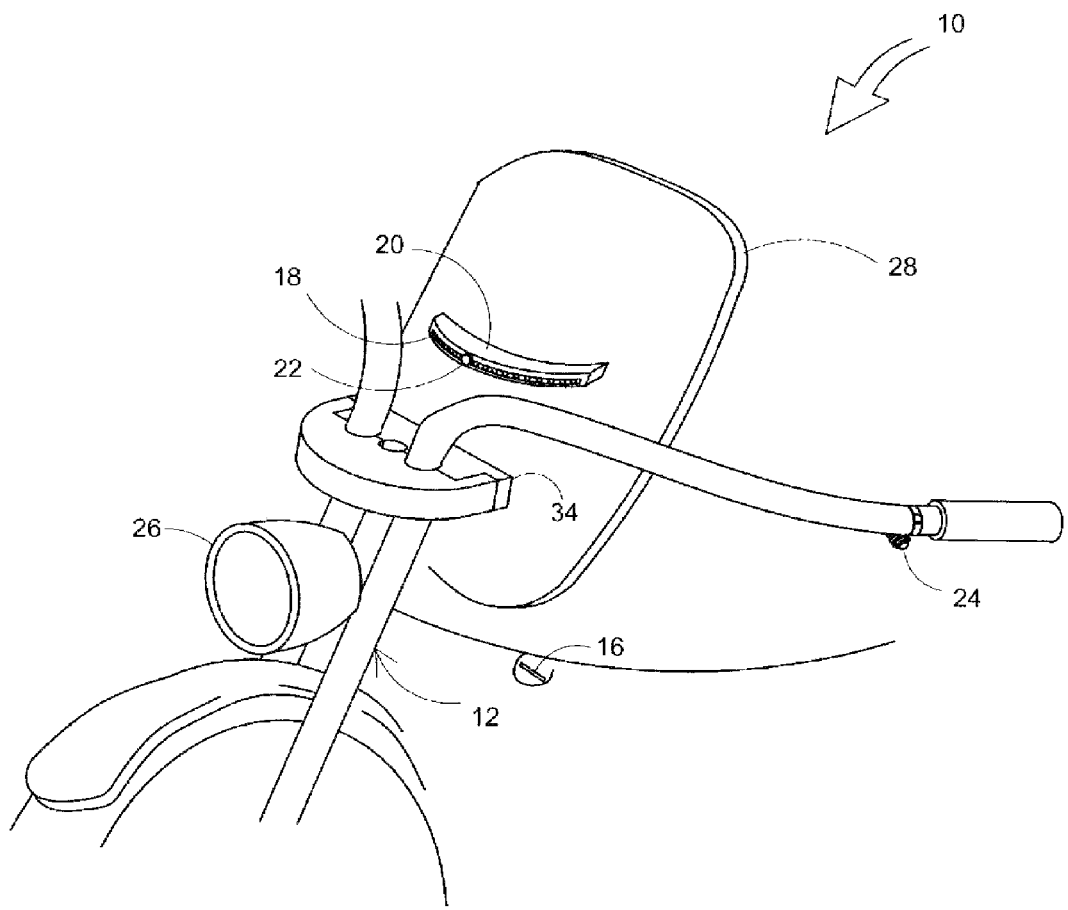
FIG. 2 is a partial perspective view of the system used on a motorcycle with a windshield according to one embodiment of the present invention.
Figure 3:
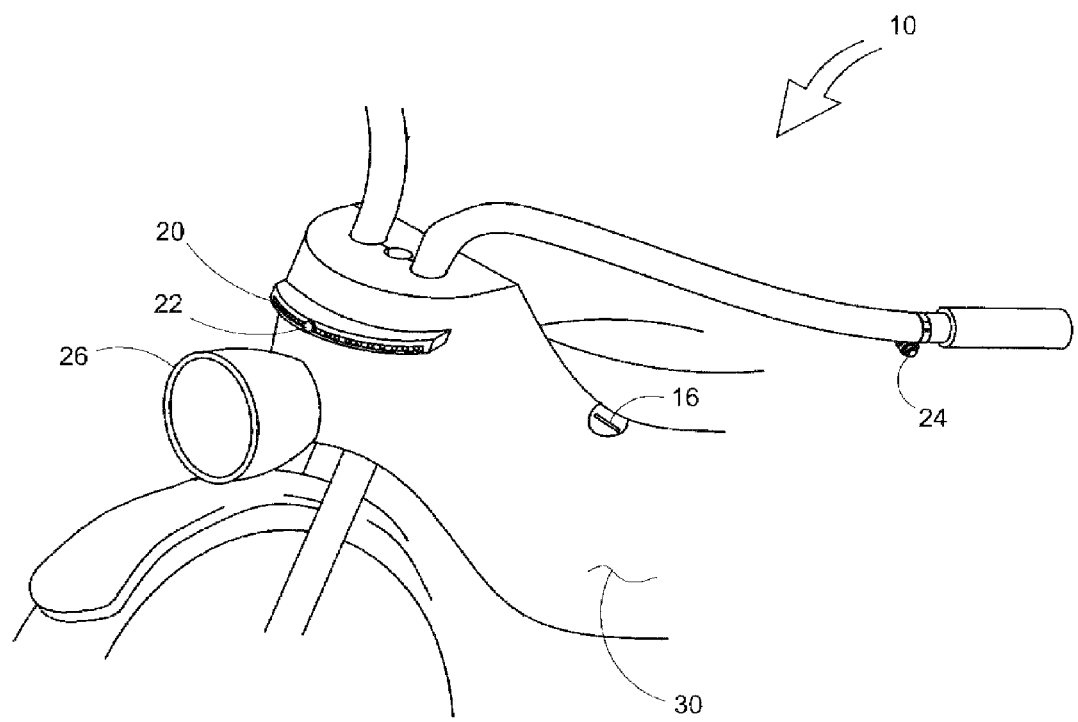
FIG. 3 is a partial perspective view of the system according to the present invention in an embodiment as a factory installed system incorporated into a motorcycle body.

The present invention includes system 10 providing warning lights and video recording capabilities. System 10 is configured as being used with motorcycle 12 whereby use of the system is contemplated as a system that is added to a existing motorcycle or as demonstrated in FIG. 1, system 10 incorporated with a motorcycle windshield 28 as demonstrated in FIG. 2, or an embodiment where the system 10 is incorporated into motorcycle body 30 as demonstrated in FIG. 3.

Figure 4:
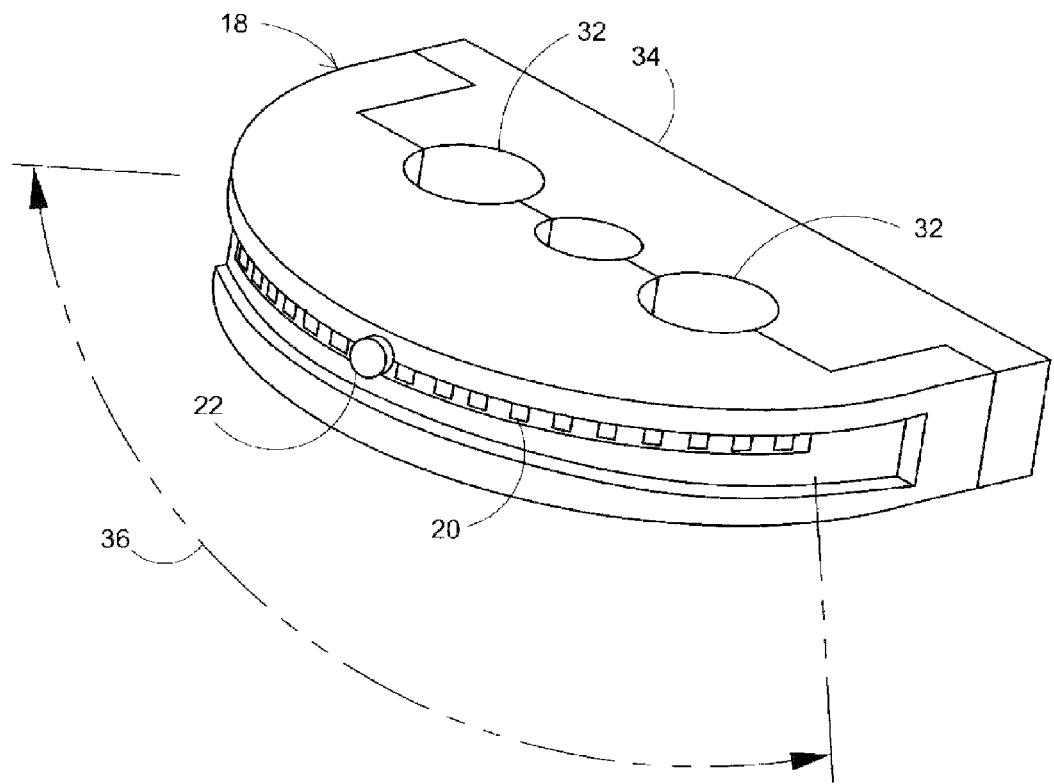
FIG. 4 is a perspective view demonstrating curvature of lights according to one embodiment the present invention.
Figure 5A:
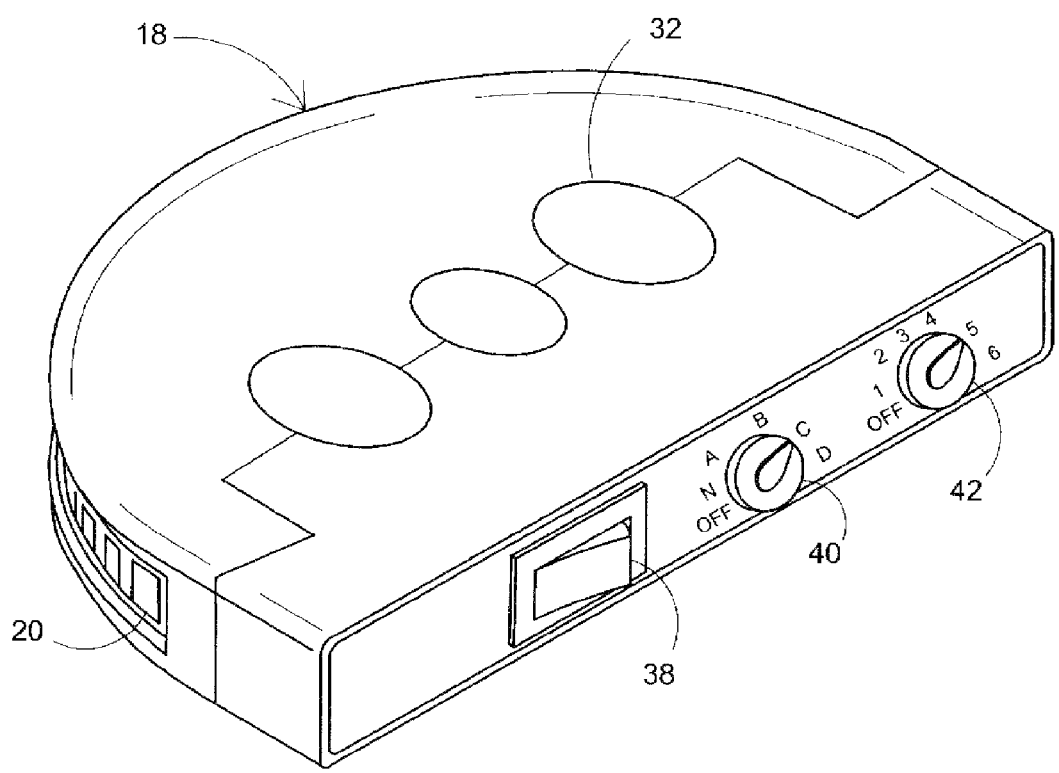
FIG. 5A is a rear perspective view demonstrating controls of the system according to one embodiment of the present invention.
Figure 5B:
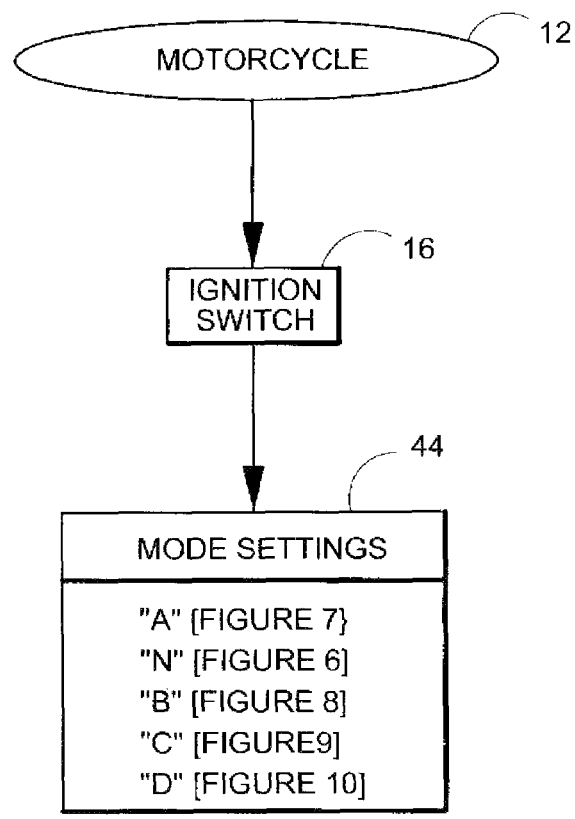
FIG. 5B is a flowchart demonstrating use of the system according to one embodiment of the present invention.

System 10 includes a console 18 constructed and arranged with a plurality of light sources 20. In one embodiment, each light source 20 is an LED lamp. In a preferred embodiment, as demonstrated in FIG. 4, the arrangement of the plurality of LED lamps 20 is along an angle of curvature 36 extending outward from the user. Outward meaning a motorcycle rider sitting on a motorcycle in a conventional manner facing forward and lights are in front of the rider further facing forward. The angle of curvature 36 is contemplated as being between about a total of 120° to 180° whereby the measurement 180° contemplates curvature about the circumference of a semicircle. Console 18 further includes a camera 22 which is forward mounted and configured to capture video images and record said video images within the system 10. In one embodiment, as demonstrated in FIG. 4 a pair of mounting cavities 32 are formed in console 18 that facilitates securing system 10 into position on each of a pair of motorcycle handlebars. This contemplated mounting is demonstrated in each of FIG. 1 and FIG. 2. Camera 22 is constructed and arranged to properly capture video images taking into account illumination emanating from motorcycle headlamp 26 that is commonly found on most commercially sold motorcycles. It is noteworthy that most states and countries have a legal requirement that motorcycles in operation constantly illuminate their headlamp even in daylight hours. Camera 22 is configured appropriately to capture images in daylight, nighttime, and all lighting conditions in between in order to accurately record video images in front of system 10.

In one embodiment, the actuator 24 is positioned near the distal end of either one of motorcycle handlebars such that a motorcycle rider actuates system 10 while writing the motorcycle without having to remove their hands from the handlebar. For example, a writer grasping each distal end of a motorcycle handlebar can actuate system 10 using movement from their thumb. A plurality of controls 34 is further accessible on console 18 whereby controls include a master on off switch 30 8A mode setting control 40 and a timer control 42. A plurality of mode settings 44 is further contemplated used with the system of the present invention.

Further contemplated in the system in the present invention are various methods set forth in FIGS. 6 through 10.

Figure 6:
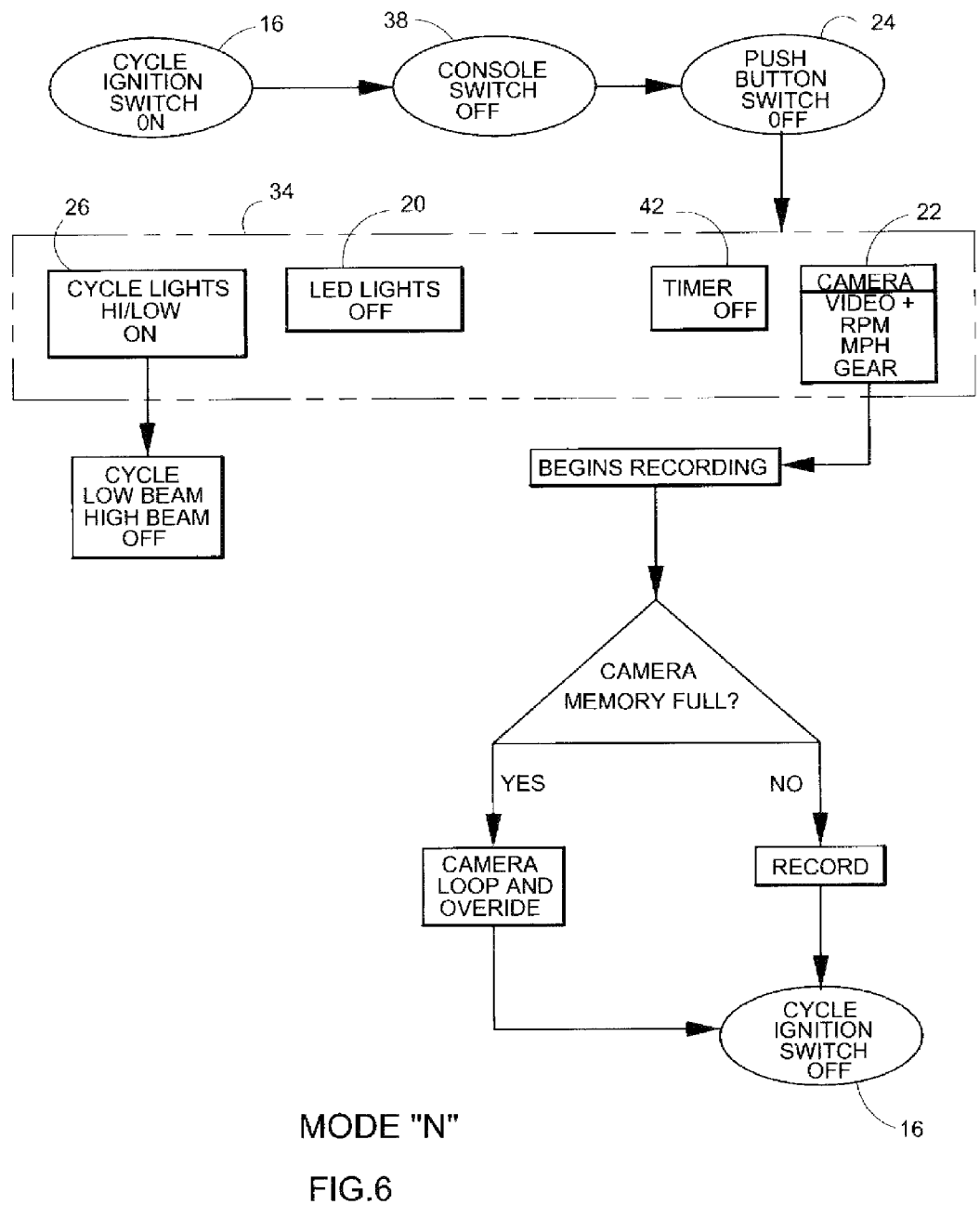
FIG. 6 is a flowchart demonstrating use of the system environment of the present invention.

In mode "N" set forth in FIG. 6 ignition switch 16 is in the on position console switch 38 is in the off position and pushbutton switch 24 is an off position even though off positions are on the console camera 22 begins recording and continues recording until the memory is full. In one configuration camera memory has a loop and override configuration such that the most recent images are always recorded and saved even if it means over writing previous images.

Figure 7:
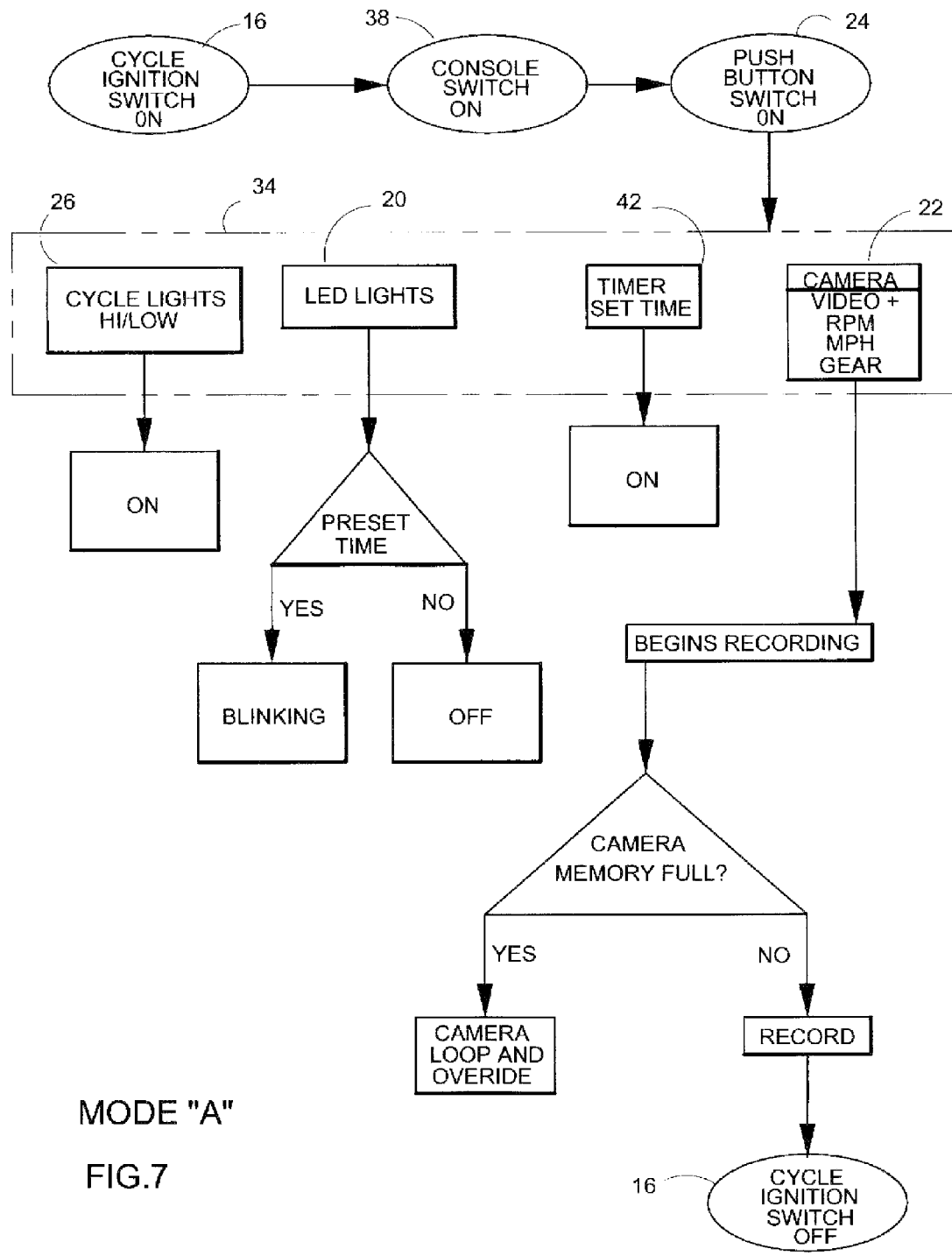
FIG. 7 is a flowchart demonstrating use of the system according to one embodiment of the present invention.

In mode "A" as set forth in FIG. 7, each of ignition switch 16 console switch 38 and push button switch 24 are activated in this configuration camera 22 is further activated and continues to record.

Figure 8:
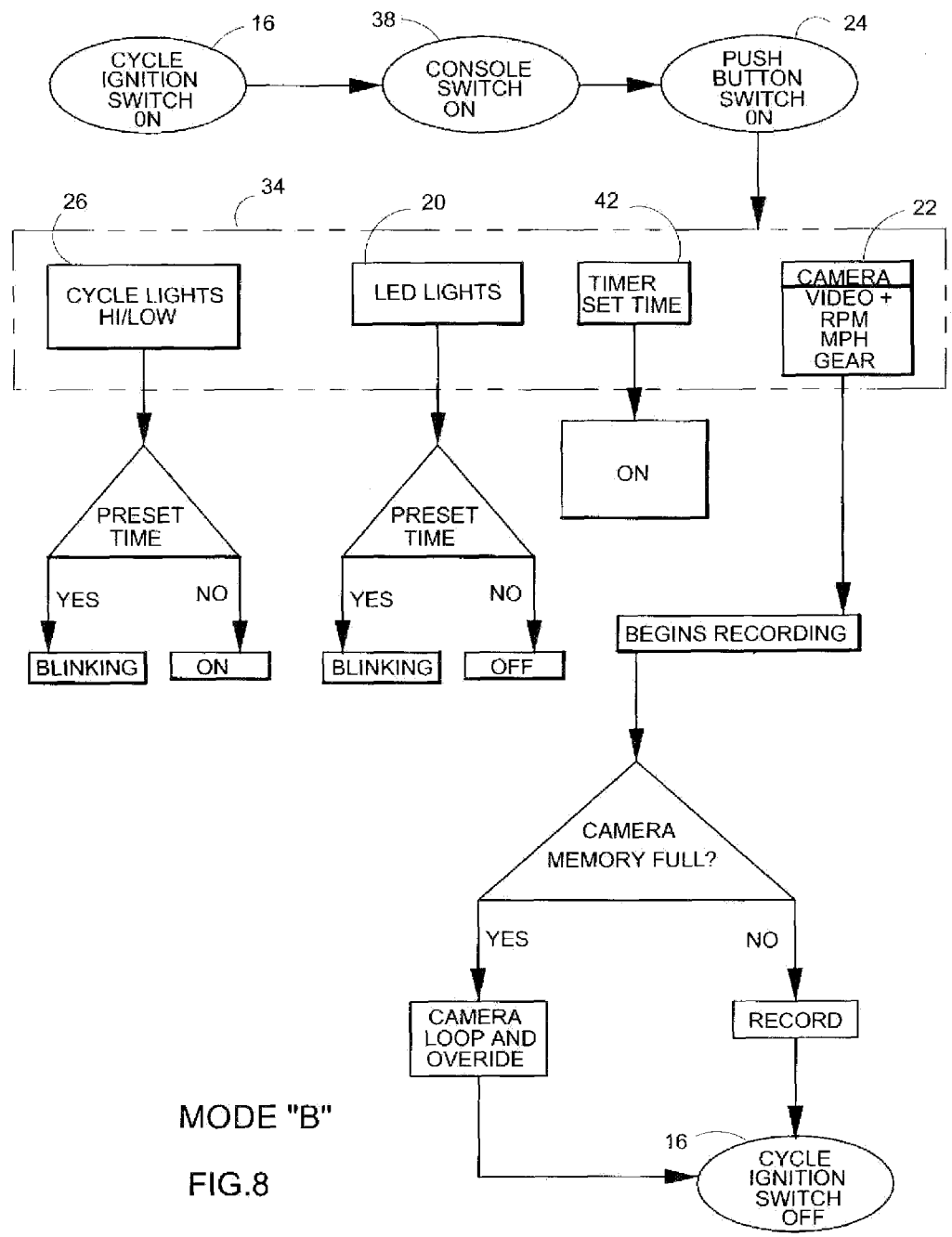
FIG. 8 is a flowchart demonstrating use of the system of according to one embodiment the present invention.

In mode "B" as set forth in FIG. 8 each of ignition switch 16 console switch 38 and push button switch 24 are actuated and eight timer 42 is actuated to record for a particular length of time.

Figure 9:
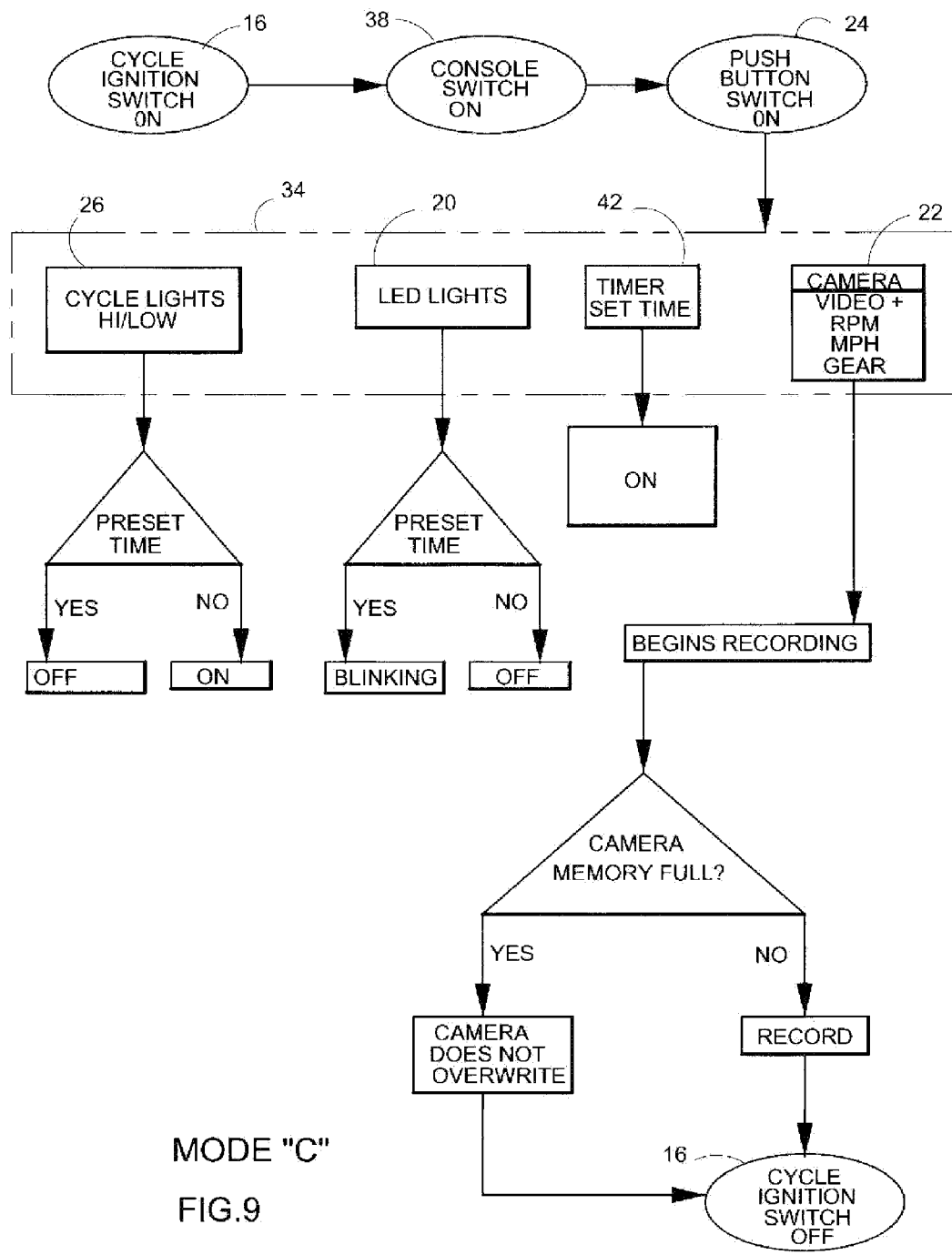
FIG. 9 is a flowchart demonstrating use of the system according to one embodiment of the present invention.
Figure 10:
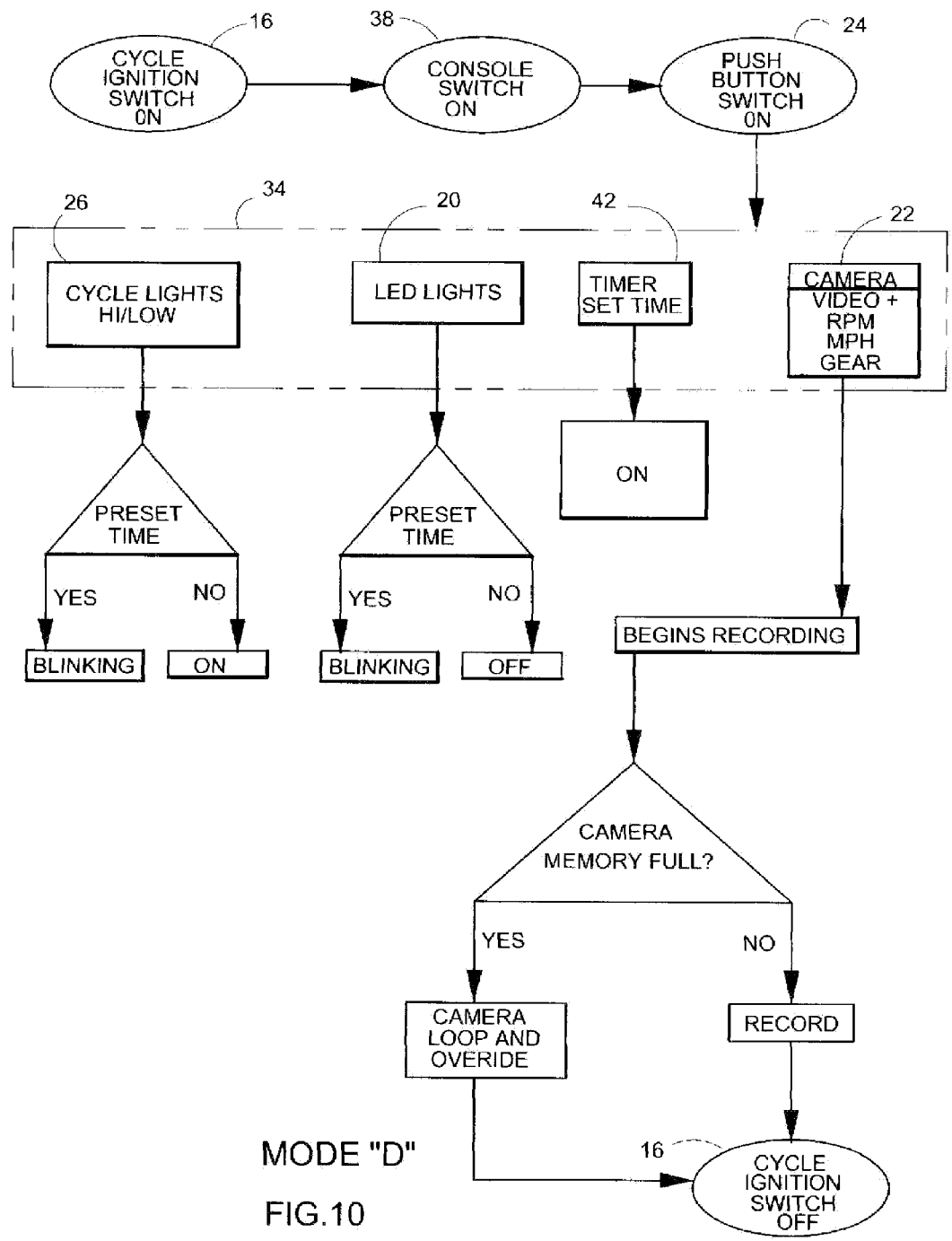
FIG. 10 is a flowchart demonstrating use of the system according to one embodiment of the present invention.

In mode "C" as set forth in FIG. 9 each of cycle lights and LED lights are user selectable for on, off, strobe, or combinations thereof.

In one embodiment, a user can actuate strobe alone light and then the horn, for example to push once on the actuator for the strobe light alone and a second push for strobe and horn.

In one embodiment, the actuator is adjustable to accommodate variable positions of a user.

While the invention has been described in its preferred form or embodiment with some degree of particularity, it is understood that this description has been given only by way of example and that numerous changes in the details of construction, fabrication, and use, including the combination and arrangement of parts, may be made without departing from the spirit and scope of the invention.

I claim:

1. A system for motorcycle safety comprising:
a module including a plurality of lights, a camera, an electronic image storage operatively associated with said camera, wherein said camera is configured in a fixed position to capture information about at least one of motorcycle speed, motorcycle gear, motorcycle engine revolutions per minute, or combinations thereof from a motorcycle instrument panel; and
an actuator for the system, wherein said camera initiates and operates once motorcycle ignition is engaged and said camera continues operating for a pre-selected amount of time after the motorcycle ignition is turned off.

2. The system of claim 1 wherein said electronic image storage includes an automatic overwrite.

3. The system of claim 1 wherein said electronic image storage includes a user selectable storage overwrite.

4. The system of claim 1 wherein said plurality of lights are user selectable to illuminate, cycle between constant illumination and variable illumination and non-illumination.

5. The system of claim 1 wherein said camera ceases operation when motorcycle engine is stopped.

6. The system of claim 1 wherein said camera continues operation when motorcycle engine is stopped and subsequently ceases operation when manually stopped.

* * * * *